Patented Aug. 8, 1950

2,517,564

UNITED STATES PATENT OFFICE 2,517,564

ASPHALT COMPOSITIONS

Denham Harman, Berkeley, and Harry J. Sommer, Lafayette, Calif., assignors to Shell Development Company, San Francisco, Calif., a corporation of Delaware No Drawing. Application August 12, 1947, Serial No. 768,266

8 Claims. (Cl. 106—273)

This invention deals with bituminous compositions and is more particularly concerned with asphalt compositions having substantially improved adhesion for aggregates.

It is well known that bituminous substances have relatively good covering and adhesive power for dry solids such as rocks, stones, sand, cement, etc. However, when the solid is moist or wet it often becomes difficult to obtain a satisfactory bond between an aggregate and a bituminous material such as asphalt. When a solid has been coated with a bituminous substance and is subsequently exposed to water or weathering it often happens that water displaces the asphalt from the solid and may strip it completely.

A number of materials have been incorporated in bituminous compositions to improve their resistance to disintegration by moisture or weathering. For the most part, the additives which have been used have been only partially successful and their effect has been found to be more or less temporary. For example, acidic additives such as oleophilic fatty acids improve the adhesion of certain asphalts to basic aggregates such as limestone. Various amines and amides have been used for similar purposes but their effect is largely confined to compositions where acidic aggregates such as granit predominate. It has been noted that the effect of any of these additives is quite specific in relation to the particular asphalt being employed. However, the greatest shortcoming which most additives exhibit is their tendency to lose their adhesion effect, especially when the asphalt or asphalt composition containing them is subjected to periods of heating. This is an extremely serious shortcoming, since most asphalts are shipped from the refinery to a construction site in heated tank cars or are heated at least immediately prior to their use in construction projects such as roads and like structures. Due to the specific nature of these various additives it is usually necessary for a manufacturer, refiner or contractor to maintain a stock of various additives and to vary his compositions according to the immediate problem at hand. Usually this involves a considerable amount of testing to ascertain whether or not a specific additive or combination thereof is effective in a particular asphalt.

It is an object of this invention to improve the adhesion of bituminous materials to solids. It is another object of this invention to provide a relatively universal adhesion agent for bituminous substances. More particularly, it is an object of this invention to provide an improved adhesion agent which is highly resistant to thermal influences and to abnormal weather and mechanical stress conditions. Other objects will become evident in the following discussion.

Now, in accordance with this invention, it has been found that sulfur containing organic nitrogenous compounds are superior asphalt adhesion agents as compared with nitrogenous compounds containing no sulfulr.

More specifically, it has been found that an unique type of polysulfide, having the general formula

wherein $n$ is an integer, each R is an organic radical, especially a hydrocarbon radical, and X is a substituent such as a hydrogen atom or an organic radical, when in combination with an oleophilic organic acid, imparts unexpected properties to bituminous composiitions. Not only does this combination of additives greatly improve the adhesion of bitumens to solid surfaces, but the resulting compositions exhibit an unaccountable improvement in compressive strength. However, of still greater importance is the fact that the improvements in these two characteristics are maintained to a great degree, even under such influences as extended heating or oxidation. This is an unexpected phenomenon, especially in view of the fact that the usual additives or combinations thereof gradually lose their effect. Furthermore, it has been found that the above combination of additives can be generally regarded as "universal" asphalt additives, in that they are effective on a considerably wider range of surfaces, as more particularly discussed hereinafter.

The preferred sulfur polymers comprising part of the combination of additives for use in the present compositions have the general formula

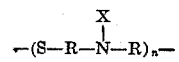

wherein $n$ is an integer, each R is an organic radical and X is a hydrogen atom or an organic radical. Preferably, each R is a hydrocarbon radical, and each X is a hydrogen atom or a hydrocarbon radical. Still more preferred polymers are those wherein each R is a saturated hydrocarbon radical having from about two to about eight carbon atoms separating the sulfur atoms from the nitrogen atoms. The polymers most effective for use in the compositions of this invention are those having a molecular weight from about 200 to about 1000, or those wherein $n$ is from about 2 to about 10.

While the polymers may be prepared by a number of suitable methods, the preferred process comprises formation of adducts between amines containing at least two unsaturated similar or dissimilar organic radicals directly attached to the amino nitrogen atom and a sulfur reagent such as hydrogen sulfide or mercaptans.

The amines from which the polymers may be prepared have the preferred structure

wherein each R is an unsaturated hydrocarbon radical and X is either a hydrocarbon radical or a hydrogen atom. Still more preferably each R is a hydrocarbon radical having an unsaturated linkage between the two carbon atoms furthest removed from the amino nitrogen atoms. Suitable amines include divinylamine, diisopropenylamine, diallylamine, dicrotylamine, dimethylallylamine, di(alpha-methylallyl)amine, (1-butene-3-yl)(2-butene-4-yl)amine, dihexenylamine, allyl (2-methyl-4-pentene-2-yl)amine, allyl linalylamine, etc.

The above type of amine may be treated with hydrogen sulfide or a mercaptan. Any sufficiently stable aliphatic mercaptan is suitable as a reactant for the formation of such adducts. A suitable aliphatic mercaptan may contain one or more sulfhydryl groups or radicals. In the majority of cases it is preferable to employ the normal or isoalkyl chain mercaptans of primary, secondary or tertiary character, particularly those contained in/or derived from petroleum or petroleum products. The methyl, ethyl, butyl, amyl, hexyl, heptyl, octyl and the like mercaptans as well as their homologs, analogs, and substitution products, may be employed with excellent results.

Another group of mercaptans which may be employed as one of the two reactants comprises the dimercaptans, and particularly the polymethylene dimercaptans of the general formula $HS(CH_2)_nSH$. This group of mercaptans may be reacted with, for example, aliphatic hydrocarbons containing a plurality of unsaturated linkages to produce polythioethers having a high molecular weight.

In forming the polymeric sulfides from the above reactants, it is preferred that the amine and sulfur compound be mixed at a temperature from about 50° C. to about 250° C. for a period of about one hour to 200 hours. Following polymerization, the monomeric or lower molecular weight polymers are removed by distillation or fractional extraction.

A typical preparation is included to illustrate the process:

Diallylamine (97 grams, 1.0 moles) and hydrogen sulfide (34 grams, 1.0 moles) were heated together in a 200 cc. stainless steel bomb for 20 hours at 120° C. Upon topping the reaction product in a Claisen flask to a kettle temperature of 200° C. an amber colored viscous residue was left; weight=66 grams.

The polymerized sulfides such as those described in the compositions of the present invention are combined with an organic oleophilic acidic material such as the higher saturated or unsaturated fatty acids including oleic acid, tall oil and stearic acid; saturated cyclic acids such as those derived from petroleum and collectively termed naphthenic acids; higher carboxylic acids, especially alkylated dicarboxylic acids such as octadecanyl succinic acid.

In the specification and claims the term "bituminous substances" is meant to include those materials containing asphaltenes or tarry constituents such as the following:

Bitumens
  Natural waxes
    Ozokerite
    Ceresine
    Montan wax
  Natural asphalt
    Malta asphalt
    Trinidad asphalt
  Asphaltites
    Gilsonite
    Glance pitch
    Grahamite
Pyrogenous distillates
  Pyrogenous waxes
    Paraffin wax
  Petroleum tars
    Oil-gas tar
  Coal tar
    Gas-retort coal tar
    Low-temperature coal tar
  Wood tars
    Pine tar
    Hardwood tar
  Miscellaneous tars
    Peat tar
    Lignite tar
    Shale tar
    Bone tar
Pyrogenous residues
  Pyrogenous asphalts
    Residual oils
    Blown petroleum asphalt
    Soft residual asphalt
    Hard residual asphalt
    Sludge asphalt
  Petroleum pitch
    Oil-gas tar pitch
  Coal-tar pitch
    Gasworks coal-tar pitch The solids toward which the subject combination of modifiers is responsive include both the acidic aggregates such as granite, quartz and feldspar as well as the basic aggregates of the limestone type in addition to other surfaces such as metals, glass, cement, etc.

These bituminous compositions should contain a total combination of additives from about 0.4 to about 6% by weight, based on the bituminous material and should contain at least 0.2%, but not more than 3%, of either one of the additives.

In accordance with the present invention, it has been discovered that this combination of additives not only initially improves the adhesion of bituminous substances for solid surfaces but that these additives provide a substantially permanent improvement in this regard in spite of any thermal influences which may be encountered. Another unexpected improvement which is related to these additions is the substantial increase in compressive strength of bituminous compositions containing them and furthermore the maintenance of this characteristic in spite of adverse thermal influences. Still another outstanding characteristic is the relatively universal effect which this combination has in regard to both asphalts and aggregates. It has been found that the combination is highly effective over a very wide range of pH values beyond that normally encountered in building materials, and furthermore the combination is effective in substantially all types of asphalts regardless of their source. The following examples have been included to illustrate the properties of the compositions of the present invention:

Example I

The following test demonstrates the improvement in compressive strength caused by the addition of the subject combination of additives to asphalts derived from several different crudes. In each case 0.375 part by weight of the polymeric adduct of diallylamine and hydrogen sulfide (described hereinabove) and 0.125 part by weight of oleic acid were incorporated in 100 parts by weight of the asphalt. The resulting composition was mixed at 77° F. with 1500 parts of crushed soda rhyolite. The graded aggregate was of a size 100% passing a 4 mesh sieve. The resulting mixture was compressed into cylinders 2 inches in diameter and 4 inches in length by application of a load of 1500 p. s. i. on both ends of the sample for 1 minute.

Six samples were prepared; one set of three was tested for compressive strength without further treatment and a second set of three was immersed for 3 days in water at 77° F., and then tested for compressive strength. The compressive strengths of the two sets were compared and the results reported below are the percentages of the original strength retained after the water soaking.

The compressive strength was tested by placing the cylinder on end and applying a downward load at a rate of one inch per minute until the cylinder disintegrates. The maximum pressure recorded by the testing machine was taken as the compressive strength. The data obtained are given below, together with comparative data from samples containing no additives.

| Source of Asphalt | No additives, Per cent Compressive Strength Retained | Additives Present, Per cent Compressive Strength Retained |
|---|---|---|
| Gulf Coast Crude | 17 | 44 |
| Venezuela Crude | 20 | 54 |
| Mid-Continent Crude | 13 | 52 |

Example II

The tests described in Example I were repeated, using the same asphalts, but doubling the amounts of the polymer and oleic acid used in each case. The retentions of compressive strength are given in the table below:

| Source of Asphalt | No additives, Per cent Compressive Strength Retained | Additives Present, Per cent Compressive Strength Retained |
|---|---|---|
| Gulf Coast Crude | 17 | 61 |
| Venezuela Crude | 20 | 60 |
| Mid-Continent Crude | 13 | 69 |

Example III

The tests described in Example I were repeated, using the same asphalts, but incorporating therewith 0.17 part polymer and 0.3 part oleic acid per 100 parts of asphalt. The improvement in compression strength retention are given in the following table.

| Source of Asphalt | No additives, Per cent Compressive Strength Retained | Additives Present, Per cent Compressive Strength Retained |
|---|---|---|
| Mid-Continent Crude | 13 | 51 |

Example IV

By using 0.34 part polymer and 0.68 part oleic acid in the Mid-Continent asphalt, a compression strength retention of 57% was obtained, by the test method described above.

Example V

In order to determine the ability of the subject combination of additives to maintain their effectiveness over long periods of heating, such as would occur during shipment to a construction site, the following test was performed:

The samples described in Example I were duplicated except that the asphalt, after the addition of additives, was held at a temperature of 250° F. for 168 hours before the test cylinders were made. The compression strength retention test, described in Example I, then was performed. The results are given in the following table:

| Source of Asphalt | No Additives, Per Cent Retention of Compression Strength | Additives Present, Per Cent Retention of Compression Strength |
|---|---|---|
| Gulf Coast Crude | 17 | 53 |
| Venezuela Crude | 20 | 47 |
| Mid-Continent Crude | 13 | 52 |

Example VI

Using the hot storage treatment described in the previous example, the samples described in Example II were reproduced with the following results:

| Source of Asphalt | No Additives, Per Cent Retention of Compression Strength | Additives Present, Per Cent Retention of Compression Strength |
|---|---|---|
| Gulf Coast Crude | 17 | 54 |
| Venezuela Crude | 20 | 54 |
| Mid-Continent Crude | 13 | 54 |

Example VII

The retention of a continuous film of asphalt on a solid surface was tested by the following procedure:

Six parts of the asphalts listed below were mixed with 100 parts of a granite aggregate ground and sieved to provide the ¼" x ½" fraction (100% passing ½" sieve, 100% retained on ¼" sieve) which had 2% by weight of water on its surfaces. In each case the coating of the aggregate was substantially complete immediately after the composition was spread out on a tin plate. After standing in open air at room temperature for one hour, the samples were covered with water for 20 hours at room temperature, after which the percent of asphalt coating retained on the aggregate was estimated. The following data were obtained:

| Source of Asphalt | Per Cent Polymer | Per Cent Oleic Acid | Per Cent Coating Retained on Aggregate |
|---|---|---|---|
| San Joaquin Valley Crude | 0 | 0 | 5 |
| Do | 0.75 | 0.25 | 95 |
| Gulf Coast Crude | 0 | 0 | 5 |
| Do | 0.75 | 0.25 | 98 |
| Do | 0.33 | 0.67 | 95 |
| Venezuelan Crude | 0 | 0 | 5 |
| Do | 0.75 | 0.25 | 75 |
| Do | 0.33 | 0.67 | 75 |
| Mid-Continent Crude | 0 | 0 | 5 |
| Do | 0.75 | 0.25 | 85 |
| Do | 0.33 | 0.67 | 80 |

*Example VIII*

In order to determine the retention of the adhesion characteristics of the subject combination of additives, some of the samples reported in the previous example were duplicated, with the exception that the asphalts containing the additives were heated for a period of 168 hours at 121° C. before being used to coat the aggregate. The test described in Example VII was then applied. The data obtained are given below:

| Source of Asphalt | Per Cent Polymer in Asphalt | Per Cent Oleic Acid in Asphalt | Per Cent Coating Retained on Aggregate |
|---|---|---|---|
| Gulf Coast Crude | 0 | 0 | 5 |
| Do | 0.75 | 0.25 | 65 |
| Mid-Continent Crude | 0 | 0 | 5 |
| Do | 0.75 | 0.25 | 70 |

*Example IX*

The test described in Example VII was repeated on compositions containing the same polymeric sulfide, but using naphthenic acids (average mol. wt.=278) in place of oleic acid. The following data were obtained.

| Source of Asphalt | Per Cent Polymer in Asphalt | Per Cent Naphthenic Acids in Asphalt | Per Cent Coating Retained on Aggregate |
|---|---|---|---|
| Gulf Coast Crude | 0 | 0 | 5 |
| Do | 0.37 | 0.13 | 90 |
| Do | 0.75 | 0.25 | 95 |
| Do | 0.13 | 0.37 | 80 |
| Do | 0.25 | 0.75 | 100 |
| Venezuelan Crude | 0 | 0 | 5 |
| Do | 0.75 | 0.25 | 90 |
| Mid-Continent Crude | 0 | 0 | 5 |
| Do | 0.75 | 0.25 | 85 |
| Do | 0.25 | 0.75 | 95 |

*Example X*

The test described in Example VII was repeated on samples containing the same sulfur polymer, but using tall oil in place of the other acids used above. The data obtained are given in the following table:

| Source of Asphalt | Per Cent Polymer in Asphalt | Per Cent Tall Oil in Asphalt | Per Cent Coating Retained on Aggregate |
|---|---|---|---|
| San Joaquin Valley Crude | 0 | 0 | 5 |
| Do | 0.35 | 0.15 | 75 |
| Do | 0.70 | 0.30 | 80 |
| Gulf Coast Crude | 0 | 0 | 5 |
| Do | 0.35 | 0.15 | 90 |
| Do | 0.70 | 0.30 | 90 |
| Do | 0.15 | 0.35 | 80 |
| Venezuelan Crude | 0 | 0 | 5 |
| Do | 0.70 | 0.30 | 70 |
| Mid-Continent Crude | 0 | 0 | 5 |
| Do | 0.35 | 0.15 | 80 |
| Do | 0.70 | 0.30 | 80 |

We claim as our invention:

1. An asphalt composition consisting essentially of asphalt and 0.2–3% by weight each of an oleophilic carboxylic acid and a polysulfide having the general configuration

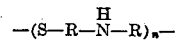

wherein $n$ is an integer from 2 to 10, R is a hydrocarbon radical having 2 to 10 carbon atoms, the molecular weight of said polysulfide being from 200 to 1000.

2. An asphalt composition consisting essentially of asphalt and 0.2–3% by weight each of an oleophilic fatty acid and a polysulfide having the general configuration

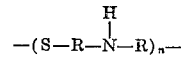

wherein $n$ is an integer from 2 to 10 and each R is an aliphatic hydrocarbon radical having 2 to 6 carbon atoms, said polysulfide having a molecular weight between 200 and 1000.

3. An asphalt composition consisting essentially of asphalt and 0.2–3% by weight each of oleic acid and a polysulfide having the general configuration

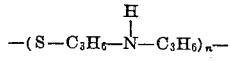

wherein $n$ is an integer from 2 to 10, said polysulfide having a molecular weight between 200 and 1000.

4. An asphalt composition consisting essentially of asphalt and 0.2–3% by weight each of naphthenic acids and a polysulfide having the general configuration

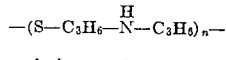

wherein $n$ is an integer from 2 to 10, said polysulfide having a molecular weight between 200 and 1000.

5. An asphalt composition consisting essentially of asphalt and 0.2–3% by weight each of tall oil and a polysulfide having the general configuration

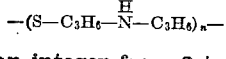

wherein $n$ is an integer from 2 to 10, said polysulfide having a molecular weight between 200 and 1000.

6. An asphalt composition consisting essentially of asphalt and 0.125% to 3% by weight of an oleophilic carboxylic acid and 0.13% by weight of a polysulfide having the general configuration

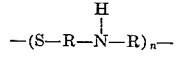

wherein $n$ is an integer from 2 to 10, and R is a hydrocarbon radical having 2 to 10 carbon atoms, the molecular weight of said polysulfide being from 200 to 1000.

7. An asphalt composition consisting essentially of asphalt and 0.2–3% by weight each of an oleophilic carboxylic acid and a polysulfide having the general configuration

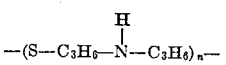

wherein $n$ is an integer from 2 to 10, said polysulfide having a molecular weight between 200 and 1000.

8. An asphalt composition consisting essentially of asphalt and 0.2-3% by weight each of an oleophilic fatty acid and a polysulfide having the general configuration

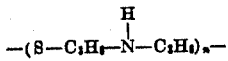

wherein $n$ is an integer from 2 to 10, said polysulfide having a molecular weight between 200 and 1000.

DENHAM HARMAN.
HARRY J. SOMMER.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,427,488 | Anderson et al. | Sept. 16, 1947 |

FOREIGN PATENTS

| Number | Country | Date |
|---|---|---|
| 560,716 | Great Britain | Apr. 18, 1944 |
| 568,385 | Great Britain | Apr. 3, 1945 |